(12) United States Patent
Diamond et al.

(10) Patent No.: US 7,621,769 B1
(45) Date of Patent: Nov. 24, 2009

(54) EDGE CONNECTOR FOR FIELD CHANGEABLE GRAPHICS SYSTEM

(75) Inventors: Michael B. Diamond, Los Gatos, CA (US); Daniel J. Driscoll, Spring, TX (US); Craig E. Dowdall, Santa Clara, CA (US); Charles E. Buffington, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 5 days.

(21) Appl. No.: 11/774,468

(22) Filed: Jul. 6, 2007

Related U.S. Application Data

(62) Division of application No. 10/822,013, filed on Apr. 9, 2004, now Pat. No. 7,248,264.

(51) Int. Cl.
*H01R 13/62* (2006.01)

(52) U.S. Cl. ........................ 439/325; 345/520

(58) Field of Classification Search .......... 439/498, 439/325–326; 345/520, 213
See application file for complete search history.

(56) References Cited

U.S. PATENT DOCUMENTS

| | | | |
|---|---|---|---|
| 4,200,900 A | 4/1980 | McGeorge | |
| 4,602,316 A | 7/1986 | Feick | |
| 4,857,002 A | 8/1989 | Jensen et al. | |
| 4,969,066 A | 11/1990 | Eibl et al. | |
| 5,493,542 A | 2/1996 | Odelid et al. | |
| 5,575,686 A | 11/1996 | Noschese | |
| 5,783,870 A | 7/1998 | Mostafazadeh et al. | |
| 5,930,496 A * | 7/1999 | MacLaren et al. | ............. 703/23 |
| 6,141,021 A | 10/2000 | Bickford et al. | |
| 6,202,039 B1 | 3/2001 | Finger | |
| 6,222,739 B1 | 4/2001 | Bhakta et al. | |
| 6,313,984 B1 | 11/2001 | Furay | |

(Continued)

FOREIGN PATENT DOCUMENTS

CA    2430040    12/2003

(Continued)

OTHER PUBLICATIONS

Excerpt from translated Office Action issued against related foreign patent application. pp. 6-7.

(Continued)

*Primary Examiner*—Truc T Nguyen
(74) *Attorney, Agent, or Firm*—Patterson & Sheridan, LLP

(57) ABSTRACT

One embodiment of an edge connector for a field changeable graphics system includes a right angle edge connector having a plurality of contact pins adapted to engage contacts on a graphics card. The edge connector is adapted to interface the graphics card with the motherboard of a computing device, without directly mounting the graphics card to the motherboard. One advantage of the disclosed edge connector is that it is compatible with a plurality of graphics cards and systems, thereby enabling a computing device user to upgrade the existing device's graphics system. Thus, the user is not forced to purchase an entirely new computing device in order to take advantage of graphics innovations. A further advantage of the disclosed edge connector is that it enables upgrades to low voltage differential signaling (LVDS) features, without the need for additional costly devices capable of operating at LVDS data rates.

18 Claims, 9 Drawing Sheets

U.S. PATENT DOCUMENTS

| | | |
|---|---|---|
| 6,331,939 B1 | 12/2001 | Corisis et al. |
| 6,380,616 B1 | 4/2002 | Tutsch et al. |
| 6,555,745 B1 * | 4/2003 | Kruse et al. ............... 174/394 |
| 6,570,561 B1 | 5/2003 | Boesch et al. |
| 6,671,177 B1 | 12/2003 | Han |
| 6,724,389 B1 * | 4/2004 | Wilen et al. ............... 345/520 |
| 6,731,514 B2 * | 5/2004 | Evans ......................... 361/790 |
| 6,731,515 B2 | 5/2004 | Rhoads |
| 6,893,268 B1 | 5/2005 | Harari et al. |
| 6,924,437 B1 | 8/2005 | Creekmore et al. |
| 7,007,159 B2 | 2/2006 | Wyatt |
| 7,024,601 B2 * | 4/2006 | Quinlan et al. ............ 714/712 |
| 7,170,757 B2 | 1/2007 | Walters et al. |
| 7,248,264 B2 | 7/2007 | Diamond et al. |
| 7,265,759 B2 | 9/2007 | Diamond et al. |
| 2002/0097234 A1 | 7/2002 | Sauber |
| 2003/0131172 A1 | 7/2003 | Lin et al. |
| 2004/0012082 A1 | 1/2004 | Dewey et al. |
| 2004/0228365 A1 | 11/2004 | Kobayashi |
| 2004/0246198 A1 | 12/2004 | Sahashi |
| 2005/0190536 A1 | 9/2005 | Anderson et al. |
| 2005/0228928 A1 | 10/2005 | Diamond et al. |
| 2005/0273824 A1 | 12/2005 | Matic |

FOREIGN PATENT DOCUMENTS

| | | |
|---|---|---|
| CN | 2574235 Y | 9/2003 |
| EP | 1372069 | 12/2003 |
| JP | 08-234931 | 9/1996 |
| JP | 11-110332 | 4/1999 |
| JP | 3097007 | 7/2003 |
| WO | WO 03/092267 | 11/2003 |
| WO | WO 2004/015554 | 2/2004 |

OTHER PUBLICATIONS

English Translation of JP 08-234931.
English Translation of JP 11-110332.
English Translation of JP 3097007.

* cited by examiner

| Pin# | Signal Name | Pin# | Signal Name | Pin# | Signal Name | Pin# | Signal Name |
|---|---|---|---|---|---|---|---|
| 1 | PWR_SRC | 2 | SVRUN | 75 | PEX_RX9 | 76 | PEX_TX9# |
| 3 | PWR_SRC | 4 | RUNPWROK# | 77 | GND | 78 | PEX_TX9 |
| 5 | PWR_SRC | 6 | 1V8RUN | 79 | PEX_RX8# | 80 | GND |
| 7 | PWR_SRC | 8 | 1V8RUN | 81 | PEX_RX8 | 82 | PEX_TX8# |
| 9 | PWR_SRC | 10 | 1V8RUN | 83 | GND | 84 | PEX_TX8 |
| 11 | PWR_SRC | 12 | 1V8RUN | 85 | PEX_RX7# | 86 | GND |
| 13 | PWR_SRC | 14 | 1V8RUN | 87 | PEX_RX7 | 88 | PEX_TX7# |
| 15 | PWR_SRC | 16 | 1V8RUN | 89 | GND | 90 | PEX_TX7 |
| 17 | GND | 18 | 1V8RUN | 91 | PEX_RX6# | 92 | GND |
| 19 | GND | 20 | GND | 93 | PEX_RX6 | 94 | PEX_TX6# |
| 21 | GND | 22 | GND | 95 | GND | 96 | PEX_TX6 |
| 23 | GND | 24 | GND | 97 | PEX_RX5# | 98 | GND |
| 25 | KEY | 26 | KEY | 99 | PEX_RX5 | 100 | PEX_TX5# |
| 27 | KEY | 28 | KEY | 101 | GND | 102 | PEX_TX5 |
| 29 | KEY | 30 | KEY | 103 | PEX_RX4# | 104 | GND |
| 31 | KEY | 32 | KEY | 105 | PEX_RX4 | 106 | PEX_TX4# |
| 33 | KEY | 34 | KEY | 107 | GND | 108 | PEX_TX4 |
| 35 | KEY | 36 | KEY | 109 | PEX_RX3# | 110 | GND |
| 37 | PEX_RX15# | 38 | PRSNT2# | 111 | PEX_RX3 | 112 | PEX_TX3# |
| 39 | PEX_RX15 | 40 | PEX_TX15# | 113 | GND | 114 | PEX_TX3 |
| 41 | GND | 42 | PEX_TX15 | 115 | PEX_RX2# | 116 | GND |
| 43 | PEX_RX14# | 44 | GND | 117 | PEX_RX2 | 118 | PEX_TX2# |
| 45 | PEX_RX14 | 46 | PEX_TX14# | 119 | GND | 120 | PEX_TX2 |
| 47 | GND | 48 | PEX_TX14 | 121 | PEX_RX1# | 122 | GND |
| 49 | PEX_RX13# | 50 | GND | 123 | PEX_RX1 | 124 | PEX_TX1# |
| 51 | PEX_RX13 | 52 | PEX_TX13# | 125 | GND | 126 | PEX_TX1 |
| 53 | GND | 54 | PEX_TX13 | 127 | PEX_RX0# | 128 | GND |
| 55 | PEX_RX12# | 56 | GND | 129 | PEX_RX0 | 130 | PEX_TX0# |
| 57 | PEX_RX12 | 58 | PEX_TX12# | 131 | GND | 132 | PEX_TX0 |
| 59 | GND | 60 | PEX_TX12 | 133 | PEX_REFCLK# | 134 | PRSNT1# |
| 61 | PEX_RX11# | 62 | GND | 135 | PEX_REFCLK | 136 | TV_C |
| 63 | PEX_RX11 | 64 | PEX_TX11# | 137 | CLK_REQ# | 138 | GND |
| 65 | GND | 66 | PEX_TX11 | 139 | PEX_RST# | 140 | TV_Y |
| 67 | PEX_RX10# | 68 | GND | 141 | RSVD | 142 | GND |
| 69 | PEX_RX10 | 70 | PEX_TX10# | 143 | RSVD | 144 | TV_CVBS |
| 71 | GND | 72 | PEX_TX10 | 145 | SMB_DAT | 146 | GND |
| 73 | PEX_RX9# | 74 | GND | 147 | SMB_CLK | 148 | VGA_RED |

FIG. 3A

| Pin# | Signal Name | Pin# | Signal Name | Pin# | Signal Name | Pin# | Signal Name |
|---|---|---|---|---|---|---|---|
| 149 | THERM# | 150 | GND | 197 | IGP_LTX3 / RSVD | 198 | LVDS_LTX3 |
| 151 | VGA_HSYNC | 152 | VGA_GRN | 199 | GND | 200 | GND |
| 153 | VGA_VSYNC | 154 | GND | 201 | IGP_LTX2# / DVI_B_TX2# | 202 | LVDS_LTX2# |
| 155 | DDCA_CLK | 156 | VGA_BLU | 203 | IGP_LTX2 / DVI_B_TX2 | 204 | LVDS_LTX2 |
| 157 | DDCA_DAT | 158 | GND | 205 | GND | 206 | GND |
| 159 | IGP_UCLK# | 160 | LVDS_UCLK# | 207 | IGP_LTX1# / DVI_B_TX1# | 208 | LVDS_LTX1# |
| 161 | IGP_UCLK | 162 | LVDS_UCLK | 209 | IGP_LTX1 / DVI_B_TX1 | 210 | LVDS_LTX1 |
| 163 | GND | 164 | GND | 211 | GND | 212 | GND |
| 165 | IGP_UTX3# / RSVD | 166 | LVDS_UTX3# | 213 | IGP_LTX0# / DVI_B_TX0# | 214 | LVDS_LTX0# |
| 167 | IGP_UTX3 / RSVD | 168 | LVDS_UTX3 | 215 | IGP_LTX0 / DVI_B_TX0 | 216 | LVDS_LTX0 |
| 169 | RSVD | 170 | GND | 217 | DVI_A_HPD | 218 | GND |
| 171 | IGP_UTX2# | 172 | LVDS_UTX2# | 219 | DVI_A_CLK# | 220 | DDCC_DAT |
| 173 | IGP_UTX2 | 174 | LVDS_UTX2 | 221 | DVI_A_CLK | 222 | DDCC_CLK |
| 175 | GND | 176 | GND | 223 | GND | 224 | LVDS_PPEN |
| 177 | IGP_UTX1# | 178 | LVDS_UTX1# | 225 | DVI_A_TX2# | 226 | LVDS_BL_BRGHT |
| 179 | IGP_UTX1 | 180 | LVDS_UTX1 | 227 | DVI_A_TX2 | 228 | LVDS_BLEN |
| 181 | GND | 182 | GND | 229 | GND | 230 | DDCB_DAT |
| 183 | IGP_UTX0# | 184 | LVDS_UTX0# | 231 | DVI_A_TX1# | 232 | DDCB_CLK |
| 185 | IGP_UTX0 | 186 | LVDS_UTX0 | 233 | DVI_A_TX1 | 234 | 2V5RUN |
| 187 | GND | 188 | GND | 235 | GND | 236 | GND |
| 189 | IGP_LCLK# / DVI_B_CLK# | 190 | LVDS_LCLK# | 237 | DVI_A_TX0# | 238 | 3V3RUN |
| 191 | IGP_LCLK / DVI_B_CLK | 192 | LVDS_LCLK | 239 | DVI_A_TX0 | 240 | 3V3RUN |
| 193 | DVI_B_HPD / GND | 194 | GND | 241 | GND | 242 | 3V3RUN |
| 195 | IGP_LTX3# / RSVD | 196 | LVDS_LTX3# | | | | |

FIG. 3B

| Signal Name | Input/Output | Description |
|---|---|---|
| DVI_A_TX0-2, DVI_A_TX0-2# | Output, 100 Ohm Diff | TMDS output for either single link DVI or dual link DVI |
| DVI_A_CLK, DVI_A_CLK# | Output, 100 Ohm Diff | TMDS clock for either single link DVI or dual link DVI |
| DVI_A_HPD | Input | TMDS panel detect |
| DVI_B_TX0-2, DVI_B_TX0-2# | Output, 100 Ohm Diff | TMDS output for either single link DVI or dual link DVI, upper bits for dual-link, Note: these pins are shared with IGP LVDS loop through pins |
| DVI_B_CLK, DVI_B_CLK# | Output, 100 Ohm Diff | TMDS clock, only used for second single-link DVI. Note: these pins are shared with IGP LVDS loop through pins |
| DVI_B_HPD | Input/GND | TMDS panel detect, only used for second single-link DVI. Tie to GND on motherboard if notebook is configured for IGP LVDS pass through |
| DDCA_CLK | Output, 3.3 V logic levels | Serial link, can connect to VGA, DVI-A or DVI-B. Configuration needs to be stored in MXM system information ROM |
| DDCA_DAT | Bi-Directional | Serial link, can connect to VGA, DVI-A or DVI-B. Configuration needs to be stored in MXM system information ROM |
| DDCB_CLK | Output, 3.3 V logic levels | Serial link, can connect to VGA, DVI-A or DVI-B. Configuration needs to be stored in MXM system information ROM |
| DDCB_DAT | Bi-Directional | Serial link, can connect to VGA, DVI-A or DVI-B. Configuration needs to be stored in MXM system information ROM |
| LVDS_PPEN | Output, 3.3 V logic levels | LVDS Panel Power enable |
| LVDS_BLEN | Output, 3.3 V logic levels | LVDS Panel backlight enable |
| LVDS_BL_BRGHT | PWM Output | LVDS Panel brightness control, duty cycle determines output level |
| LVDS_UTX0-3, LVDS_UTX0-3# | Output, 100 Ohm Diff | LVDS output for dual link |
| IGP_UTX0-2, IGP_UTX0-2# | Input, 100 Ohm Diff | LVDS input that loops back to LVDS_UTX0-2, LVDS_UTX0-2# to provide path for LVDS with IGP only. Note: these pins are shared with DVI_B pins |
| LVDS_UCLK, LVDS_UCLK# | Output, 100 Ohm Diff | LVDS clock for dual link |

| Signal Name | Input/Output | Description |
|---|---|---|
| IGP_UCLK, IGP_UCLK# | Input, 100 Ohm Diff | LVDS input that loops back to LVDS_UCLK, LVDS_UCLK# to provide path for LVDS with IGP only. Note: these pins are shared with DVI_B pins |
| LVDS_LTX0-3, LVDS_LTX0-3# | Output, 100 Ohm Diff | LVDS output for either single link or dual link |
| IGP_LTX0-2, IGP_LTX0-2# | Input, 100 Ohm Diff | LVDS input that loops back to LVDS_LTX0-2, LVDS_LXT0-2# to provide path for LVDS with IGP only. Note: these pins are shared with DVI_B pins |
| LVDS_LCLK, LVDS_LCLK# | Output, 100 Ohm Diff | LVDS clock for either single link or dual link |
| IGP_LCLK, IGP_LCLK# | Input, 100 Ohm Diff | LVDS input that loops back to LVDS_LCLK, LVDS_LCLK# to provide path for LVDS with IGP only. Note: these pins are shared with DVI_B pins |
| TV_Y | Output, 37.5 Ohm +/- 2 Ohms | TV_OUT Chroma |
| TV_C | Output, 37.5 Ohm +/- 2 Ohms | TV_OUT Luma |
| TV_CVBS | Output, 37.5 Ohm +/- 2 Ohms | TV_OUT Composite |
| DDCC_CLK | Output, 3.3 V logic levels | Serial link, connect to EDID LVDS Panel and to MXM System Information ROM. This link is not to be used for external interfaces |
| DDCC_DAT | BI-Directional | Serial link, connect to EDID LVDS Panel and to MXM System Information ROM. This link is not to be used for external interfaces |
| VGA_BLU | Output, 37.5 Ohm +/- 2 Ohms | RGB Output |
| VGA_RED | Output, 37.5 Ohm +/- 2 Ohms | RGB Output |
| VGA_GRN | Output, 37.5 Ohm +/- 2 Ohms | RGB Output |
| VGA_HSYNC | Output, 75 Ohm 3.3 V logic levels | RGB Horizontal Sync |
| VGA_VSYNC | Output, 75 Ohm 3.3 V logic levels | RGB Vertical Sync |
| SMB_CLK | Input, 5 V tolerant | Serial link for thermal sensor on GPU. Connect to motherboard's SMBus Clock signal. |
| SMB_DAT | Bi-Dir, 5 V tolerant | Serial link for thermal sensor on GPU. Connect to motherboard's SMBus Data signal. |
| THERM# | Output, active low | Indicates a thermal alert, Connect to motherboard's SMBus Alert signal. |
| PRSNT1# | GND | Card present detect, indicates if MXM module is present. Tie to pull-up on motherboard. If high then MXM is not present. If low then MXM is present. Can be used to control IGP upgrade multiplexers |

FIG. 4C

| Signal Name | Input/Output | Description |
|---|---|---|
| PRSNT2# | GND | Tied to Ground on both motherboard and MXM. Reserved for future functionality. |
| CLK_REQ# | Output, active low | Indicates need for PEX_REFCLK |
| PEX_RST# | Input, active low | PCI_Express reset |
| PEX_REFCLK, PEX_REFCLK# | Input, 100 Ohm Diff | PCI-Express reference clock |
| PEX_TX0-15, PEX_TX0-15# | Output, 100 Ohm Diff | PCI-Express 16 lanes, output from northbridge |
| RUNPWROK | Input | Indicates that all power to the MXM is within the specified tolerances |
| 3V3RUN | Power input | 3.3 V run power |
| 5VRUN | Power input | 5 V run power |
| 2V5RUN | Power input | 2.5 V run power |
| 1V8RUN | Power input | 1.8 V run power |
| PWR_SRC | Power input | Battery power |

FIG. 5

| Voltage Rail | Voltage | Current | Power | Notes |
|---|---|---|---|---|
| 3V3RUN | 3.3 V +/- 5% | 1.5 Amps | 4.95 W | 3.3 V run |
| 5VRUN | 5 V +/- 5% | 0.5 Amps | 2.5 W | 5 V run |
| 2V5RUN | 2.5 V +/- 5% | 0.5 Amps | 1.25 W | 2.5 V run |
| 1V8RUN | 1.8 V +/- 5% | 3.5 Amps | 6.3 W | 1.8 V run |
| PWR_SRC | 7.5 V to 22 V | Up to 4 Amps | 8.9 W to 38.9 W | Battery, store power capability in MXM system information ROM |

EDGE CONNECTOR FOR FIELD CHANGEABLE GRAPHICS SYSTEM

CROSS-REFERENCE TO RELATED APPLICATIONS

This application is a divisional application of, and claims priority benefit to, co-pending U.S. patent application Ser. No. 10/822,013, filed Apr. 9, 2004, which is incorporated by reference herein.

BACKGROUND OF THE INVENTION

1. Field of the Invention

This invention relates generally to computer hardware and relates more particularly to a field changeable graphics system for a computing device.

2. Description of the Background Art

Contemporary computing devices typically incorporate a graphics card that enables a computing device to rapidly process graphics related data for graphics intensive applications, such as gaming applications. A graphics card generally comprises a printed circuit board (PCB) upon which a plurality of circuit components (such as memory chips and the like) and a graphics processing unit (GPU) are mounted. In "closed platform" computing devices such as laptop computers, cellular telephones and personal digital assistants (PDAs) (i.e., devices that use processors and are not easily changed by a user), the graphics card is mounted directly and permanently to the motherboard of the computing device.

One drawback to mounting the graphics card directly to the motherboard is that this fixed configuration impedes a user's ability to upgrade the computing device's graphics system. Specifically, in order to take advantage of an improved graphics system, the user typically must purchase an entirely new computing device, which is much more costly than a simple replacement of the graphics system in the existing computing device.

A second drawback is that the pace of graphics innovations that can be conveniently delivered to computing device users is hindered, because the implementation of on-board devices is typically limited by a design cycle of approximately nine to twelve months.

Thus, there is a need in the art for a field changeable graphics system for a computing device.

SUMMARY OF THE INVENTION

One embodiment of an edge connector for a field changeable graphics system includes a right angle edge connector having a plurality of contact pins adapted to engage contacts on a graphics card. The edge connector is adapted to interface the graphics card with the motherboard of a computing device, without directly mounting the graphics card to the motherboard.

One advantage of the disclosed edge connector is that it is compatible with a plurality of graphics cards and systems, thereby enabling a computing device user to upgrade the existing device's graphics system. Thus, the user is not forced to purchase an entirely new computing device in order to take advantage of graphics innovations. This advantage is particularly significant for users of portable computing devices, such as laptop computers, cellular telephones and PDAs, or other devices traditionally having fixed graphics functionality such as video game consoles.

A further advantage of the disclosed edge connector is that it enables upgrades to low voltage differential signaling (LVDS) features, without the need for an additional (and typically costly) device that is capable of operating at LVDS data rates.

BRIEF DESCRIPTION OF THE DRAWINGS

FIGS. 3A-B are tables illustrating one embodiment of a pinout for the edge connector illustrated in FIG. 2;

FIGS. 4A-C are tables containing contact pin descriptions for each signal type identified in FIGS. 3A-B;

FIG. 5 is a table summarizing the power that must be supplied through an edge connector from a motherboard to a graphics card, according to one embodiment of the present invention;

DETAILED DESCRIPTION OF THE INVENTION

Figure 1:
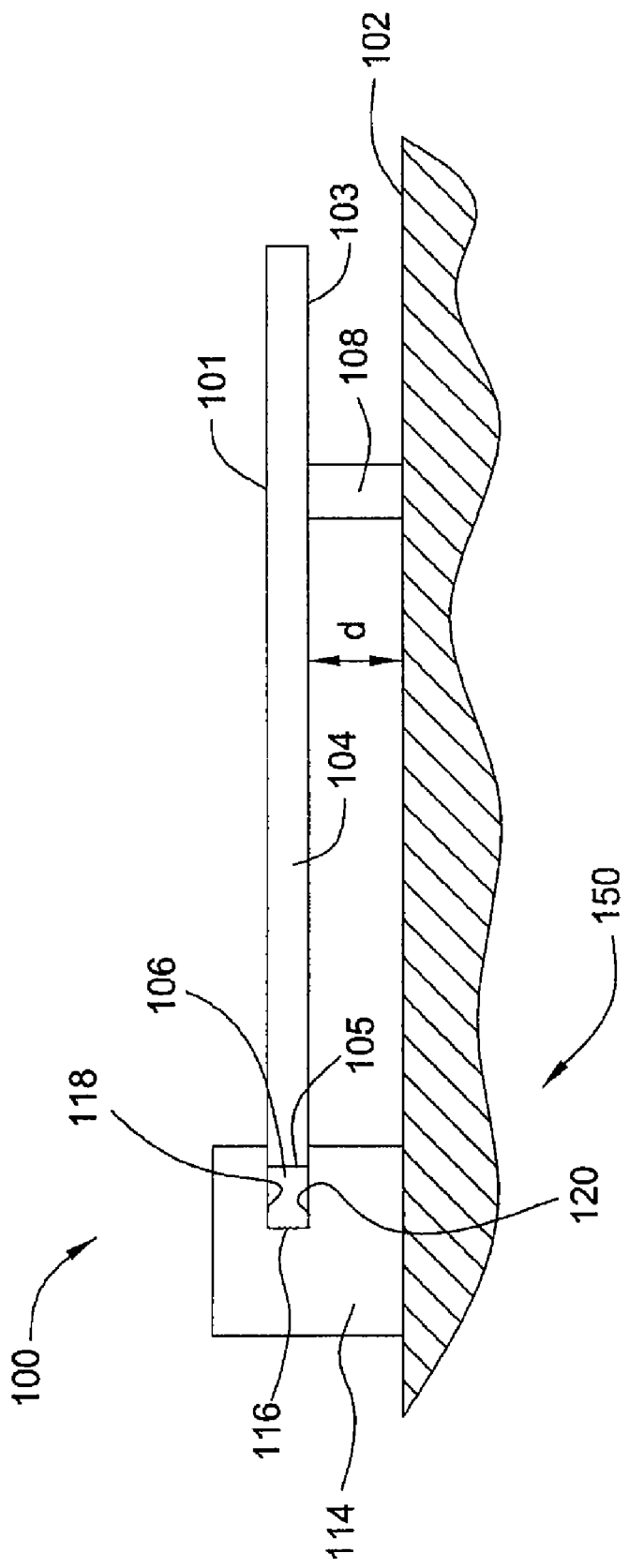
FIG. 1 is a side view illustrating a field changeable graphics system, according to one embodiment of the present invention.

FIG. 1 is a side view illustrating a field changeable graphics system 100, according to one embodiment of the present invention. Graphics system 100 is adaptable for use with any type of computing device, including, without limitation, a desktop computer, server, laptop computer, palm-sized computer, personal digital assistant, tablet computer, game console, cellular telephone, computer-based simulator and the like. As will be explained in further detail below in conjunction with FIGS. 6A-7B, graphics system 100 is configured to ensure compatibility with a plurality of field changeable graphics cards.

Generally, graphics system 100 is configured to interface with a computing device motherboard 102 in lieu of a conventional graphics card and includes, without limitation, a graphics card 104 and an interface assembly 150. Graphics card 104 includes a GPU and a plurality of circuit components including memory (not shown) mounted to a first face 101, typically facing away from motherboard 102. Graphics card 104 further comprises a card connector 106 positioned along an edge 105 of graphics card 104 and adapted to engage interface assembly 150. Several embodiments of field changeable graphics cards suitable for use in graphics system 100 are described in co-pending, commonly assigned U.S. Pat. No. 7,170,757, Issued Jan. 30, 2007 by Driscoll et al., which is herein incorporated by reference.

As also described in further detail below in conjunction with FIGS. 2-5, graphics system 100 is configured to interface with motherboard 102 without being directly mounted to motherboard 102. This is enabled by interface assembly 150, which includes, without limitation, one or more supports 108 and an edge connector 114. Supports 108 are mounted to motherboard 102 and extend upward therefrom to engage graphics card 104. Supports 108 are adapted to stably maintain graphics card 104 in a spaced-apart orientation relative to motherboard 102. In one embodiment, supports 108 are sized to maintain a distance d between graphics card 104 and motherboard 102 that is approximately 4 mm.

Figure 2:
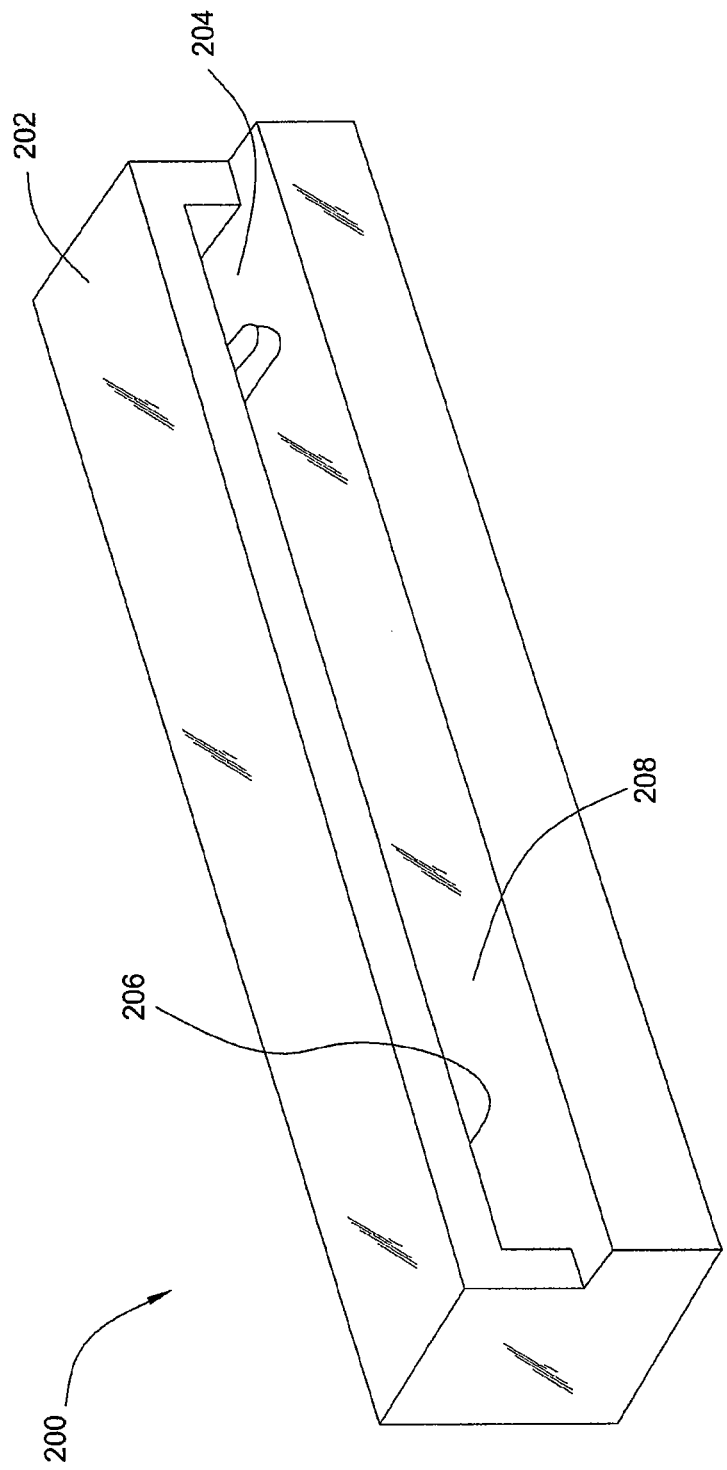
FIG. 2 is a top plan view illustrating a graphics card for use in field changeable graphics system of FIG. 1, according to one embodiment of the present invention.

Also as described in conjunction with FIG. 2, edge connector 114 is mounted to motherboard 102 and includes a lengthwise channel 116 having a plurality of contacts disposed on upper and lower surfaces 118, 120. The contacts are adapted for engaging card connector 106 on graphics card 104, for routing external and internal interfaces from graphics card 104 to motherboard 102.

FIG. 2 is an isometric view illustrating one embodiment of an edge connector 200 according to the present invention. Edge connector 200 is adapted to route all internal and external interfaces from a graphics card (e.g., graphics card 104 of FIG. 1) to a motherboard of a computing device. Edge connector 200 comprises an elongated body 202 having a longitudinal slot 204 formed therein. Longitudinal slot 204 is sized to receive an edge of a graphics card connector (e.g., card connector 106). In one embodiment, longitudinal slot 204 is sized to accommodate card thicknesses of up to 1.2 mm. Contact pins (not shown) disposed on top and bottom surfaces 206, 208 of longitudinal slot 204 are adapted to interface with contacts on a card connector.

FIGS. 3A-B are tables illustrating one embodiment of a pinout for edge connector 200. Each contact pin on edge connector 200 is associated with an individual signal (e.g., power input, ground and the like). In the embodiment illustrated, edge connector 200 utilizes a 230-pin card-edge connection system, wherein contact pins on edge connector 200 are rated for 0.5 A steady state current. FIGS. 4A-C are tables containing contact pin descriptions for each signal type identified in FIGS. 3A-B. Input/output classifications in FIGS. 4A-C are relative to a GPU mounted on the graphics card. References to "MXM module" indicate a graphics card according to the present invention.

FIG. 5 is a table summarizing the power that must be supplied by the motherboard to a graphics card, i.e., through edge connector 200, according to one embodiment of the present invention. If the motherboard's power supply equals or exceeds the power requirements summarized in FIG. 5, a graphics card interfaced to an edge connector according to the present invention (e.g., edge connector 200) will run at full speed. However, the interface will also allow a graphics card to detect power supply limitations of the motherboard and to automatically throttle its clocks to stay within the limits of the available power.

In addition to the power requirements summarized in FIG. 5, a motherboard must meet a plurality of additional system requirements in order to effectively interface to a graphics system of the present invention. For example, in one embodiment, the motherboard is required to place a serial ROM that connects to the DDCC_DAT and DDCC_CLK signals (e.g., connector pins 220 and 222 in FIG. 3B). In addition, the motherboard must provide back drive isolation and level shifting, for all DDC lines, VGA_HSYNC and VGA_VSYNC signals (e.g., connector pins 151 and 153). Furthermore, the motherboard must provide power to the computing device LVDS panel, and must route all RGB signals and TV_out signals with 37.5 Ohms impedance. In one embodiment, the motherboard is also required to have output filters on all VGA output lines and on all TV output lines, the filters being positioned as closely as possible to the connector pins. Input filters are required on the DVI_B_HPD and DVI_A_HPD lines (e.g., connector pins 191 and 217), and the graphics card will provide level shifting and clamping for the DVI_B_HPD and DVI_A_HPD signals.

In one embodiment, an edge connector according to the present invention (e.g., edge connector 200) is adapted to detect a graphics mode of a computing device, and to cause display interfaces to be routed from a graphics card to the motherboard accordingly. Specifically, the PRSNT#1 connector pin on the edge connector (e.g., pin 134 in the pinout of FIGS. 3A-B) is adapted to detect if a graphics upgrade, such as any one of the graphics cards disclosed in U.S. Pat. No. 7,170,757, has been implemented in the computing device. In one embodiment, a voltage detected by the PRSNT #1 connector pin indicates the presence of a graphics upgrade. For example, a high voltage detected by the PRSNT#1 connector pin indicates that a "dummy" or "loop-through" card (e.g., a card with no graphics processing unit) is interfaced to the edge connector, as explained in further detail in conjunction with FIGS. 6A and 7A below. Alternatively, a low voltage detected by the PRSNT#1 connector pin indicates that a graphics upgrade such as a graphics card is interfaced to the edge connector, as explained in further detail in conjunction with FIGS. 6B and 7B below.

Figure 6A:
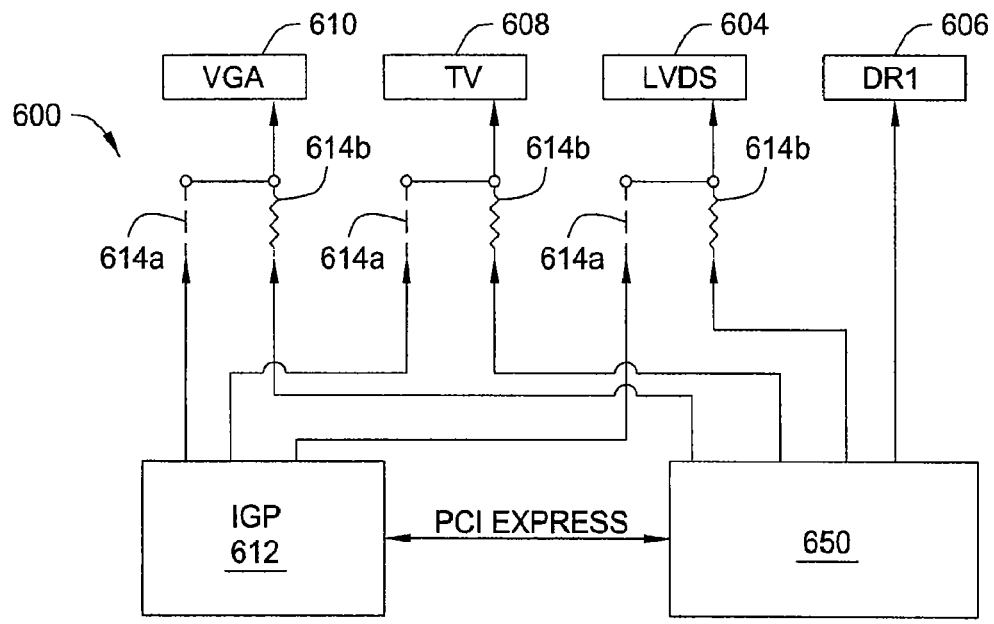
FIG. 6A is a schematic diagram illustrating a configurable graphics system according to one embodiment of the present invention.

FIG. 6A is a schematic diagram illustrating a configurable graphics system 600, according to one embodiment of the present invention. The output topology illustrated in FIG. 6A depicts a manufacturing-end graphics configuration (i.e., graphics system 600 is incorporated during assembly of the computing device). Graphics system 600 comprises a standard integrated graphics processor (IGP) 612 (driven in one embodiment by a Northbridge chip set, not shown), a loop-through card 650, and a plurality of display panels 604-610 for video graphics array (VGA), television (TV), low voltage differential signaling (LVDS) and digital video interface (DVI) signals. The display output signals are generated by IGP 612 in conjunction with loop-through card 650, as described further below.

Loop-through card 650 may be implemented in graphics system 600 in place of a conventional LVDS capable device. As described above, the PRSNT #1 connector pin on the edge connector detects a high voltage and sends a corresponding signal to the Northbridge chip set indicating the presence of loop-through card 650. Consequently, the Northbridge outputs LVDS signals to the edge connector, in one embodiment connecting the signals to the IGP_LVDS connector pins. The passive loop-through card 650 completes the circuit paths between the output signals and the LVDS panel input signals. Thus, the edge connector, in conjunction with loop-through card 650, enables a computing device user to implement LVDS features without the need to implement complex (and costly) traditional LVDS-capable devices.

In one embodiment, the graphics system 600 further supports DVI. In this embodiment, DVI signals are output to the DVI_A connector pins (e.g., connector pins 219, 221, 225, 227, 231, 233, 237 and 239 in FIG. 3B) on the edge connector and routed to loop-through card 650, which further comprises a transmission minimized differential signaling (TMDS) transmitter for driving TMDS outputs on received signals. TV and VGA signals are output from the Northbridge chip set to IGP 612 in accordance with standard IGP operation.

In one embodiment, graphics system 600 further comprises a plurality of stuffing resistors 614a and 614b (shown in phantom) adapted for completing the circuits from IGP 612 and from loop-through card 650 to display panels 604-610. During assembly of a computing system, a manufacturer may configure graphics system 600 to operate in the mode described (e.g., incorporating loop-through card 650) by closing the circuit paths through resistors 614a and leaving the circuit paths through resistors 614b open.

Figure 6B:
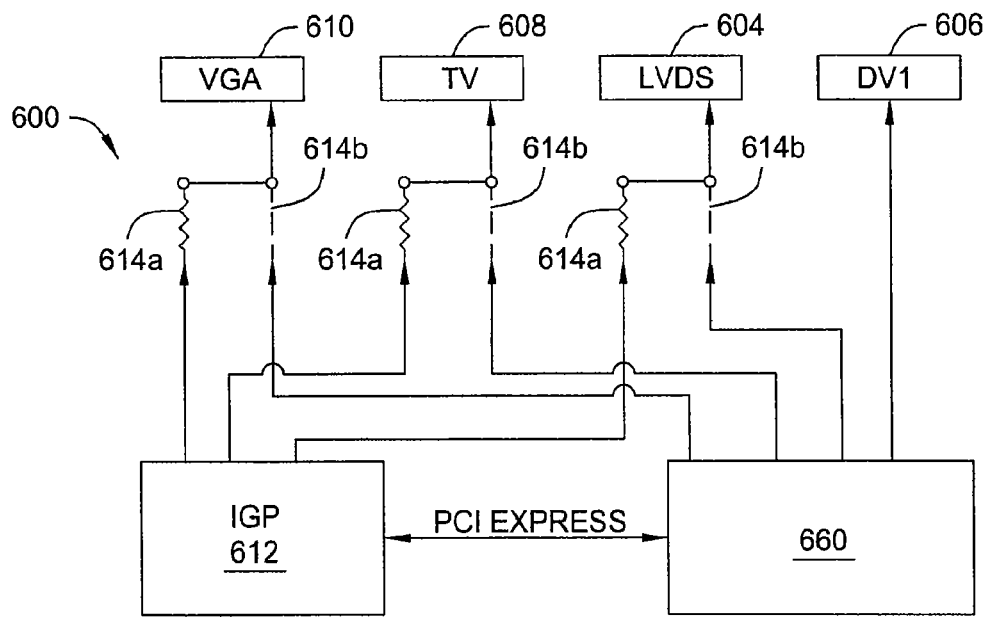
FIG. 6B is a schematic diagram illustrating graphics system according to another embodiment of the present invention.

Alternatively, as illustrated in FIG. 6B, a manufacturer may close the circuit paths through resistors 614b and leave the circuit paths through resistors 614a open, in order to implement an active graphics card. In this embodiment, graphics system 600 comprises a graphics card 660 in place of loop-through card 650. Graphics card 660 may be configured in a manner similar to any one of the graphics cards described in U.S. Pat. No. 7,170,757. Graphics card 660 generates substantially all display output signals, as described further below.

As described above, the PRSNT #1 connector pin on the edge connector detects a low voltage and sends a corresponding signal to the Northbridge chip set indicating the presence of graphics card 660. Consequently, the Northbridge outputs a peripheral component interface (PCI) Express signal to the edge connector, which routes the signal to graphics card 660. VGA, TV, LVDS and DVI signals are subsequently generated by graphics card 660. As described above, stuffing resistors 614b complete the circuits from graphics card 660 to display panels 604-610.

Figure 7A:
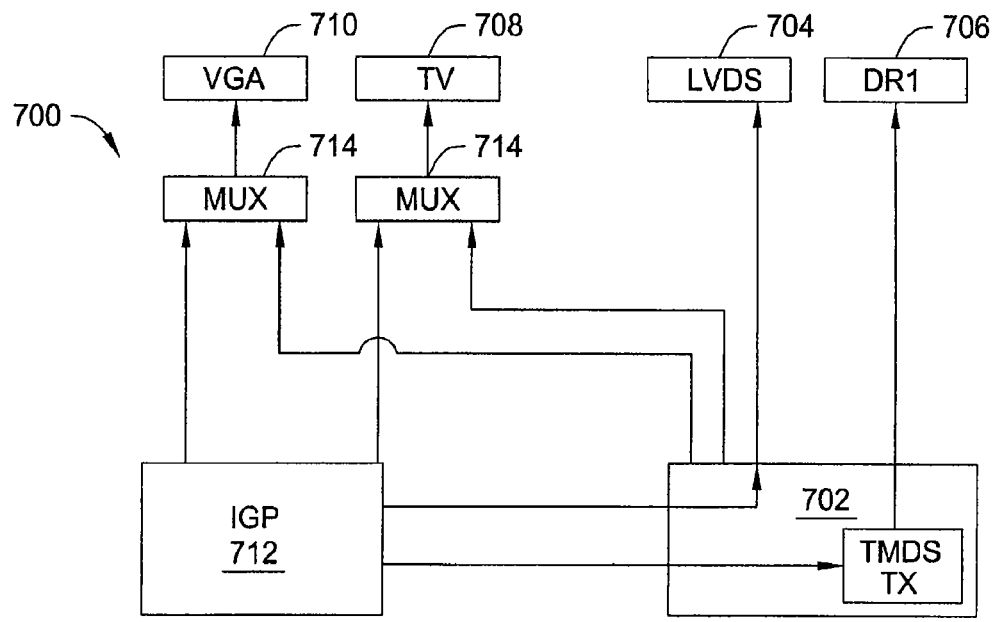
FIG. 7A is a schematic diagram illustrating a user-upgradeable graphics system, according to one embodiment of the present invention.

FIG. 7A is a schematic diagram illustrating a graphics system 700 according to one embodiment of the present invention. The output topology illustrated in FIG. 7A depicts a user-upgradeable configuration. That is, a user may upgrade graphics system 700 on demand, by simply exchanging one field-exchangeable graphics card for another. Graphics system 700 is substantially similar to graphics system 600 illustrated in FIG. 6A and comprises an IGP 712, a loop-through card 702, and a plurality of display panels 704-710 for VGA, TV, LVDS and DVI signals. The display output signals are generated by IGP 712 in conjunction with loop-through card 702, as described further below.

LVDS and DVI signals are output by the Northbridge to the edge connector as described above in conjunction with FIG. 6A. The passive loop-through card 702 completes the circuit paths between the output signals and the LVDS and DVI panel input signals. TV and VGA signals are output from the Northbridge chip set to IGP 712 in accordance with standard IGP operation. In one embodiment, graphics system 700 further comprises a plurality of muxes 714 adapted for receiving and transmitting IGP-initiated signals (e.g., for VGA and TV signals). During assembly of a computing system, a manufacturer may configure graphics system 700 to operate in the mode illustrated in FIG. 7A (e.g., incorporating loop-through card 702) as a default.

Figure 7B:
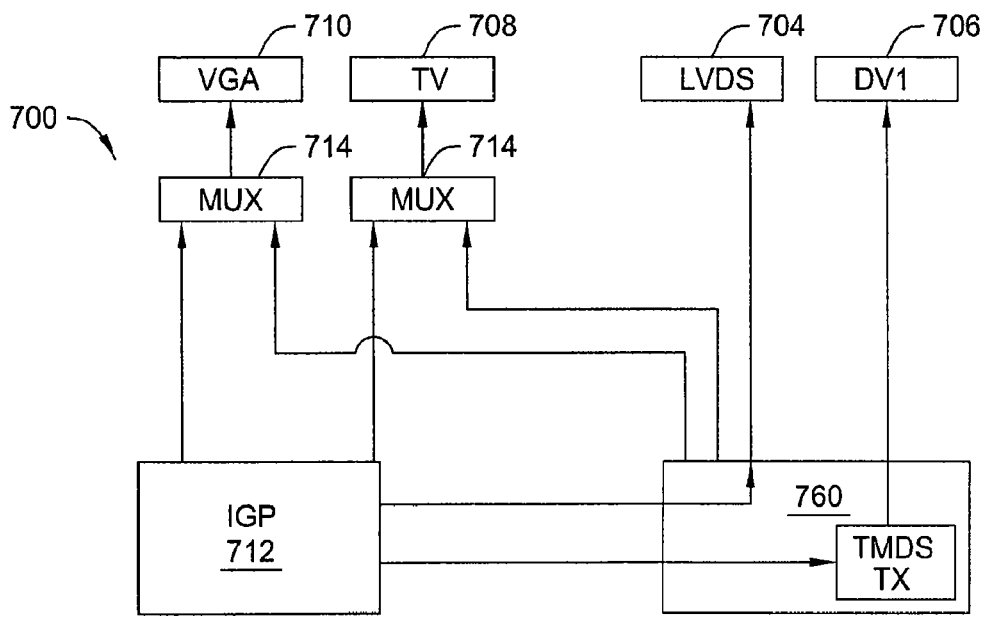
FIG. 7B is a schematic diagram illustrating a user-upgradeable graphics system, according to another embodiment of the present invention.

FIG. 7B is a schematic diagram illustrating graphics system 700 in an upgraded mode. Graphics system 700 is substantially similar to graphics system 600 illustrated in FIG. 6B and comprises an IGP 702, a plurality of display panels 704-710 for VGA, TV, LVDS and DVI signals and an active graphics card 760 in place of loop-through card 702.

When the presence of graphics card 760 is detected, the Northbridge sends a PCI Express signal through the edge connector and to graphics card 760. Muxes 714 are configured to automatically reconfigure to connect VGA and TV circuit paths to graphics card 760.

An edge connector according to the present invention may thus be configured to enable a computing device user to upgrade an existing device's graphics system with minimal expense. Because the edge connector is adapted to work with a plurality of field-changeable graphics cards, the user is not forced to purchase an entirely new computing device in order to take advantage of graphics innovations. This advantage is particularly significant for users of portable computing devices, such as laptop computers and PDAs, in which graphics systems are frequently difficult or impossible to alter.

A further advantage of the disclosed edge connector is that it enables upgrades to LVDS features. Typical devices capable of operating at LVDS data rates tend to be rather costly. However, by configuring the edge connector of the present invention to enable LVDS signals to "loop through" a passive card, the versatility of the graphics system is enhanced with minimal cost to the user.

Moreover, though the present invention has been described in terms of graphics cards, those skilled in the art will appreciate that the invention may be adapted for use with other devices that are typically hardwired to a motherboard, such as audio chips and the like.

Thus, the present invention represents a significant advancement in the field of computing device graphics systems. An edge connector is provided that enables a plurality of field-changeable graphics systems to interface to a single computing device motherboard. The edge connector thus maximizes the graphics options that may be implemented in an existing computing device, allowing computing device users greater ability to take advantage of graphics innovations.

Furthermore, the present invention grants more flexibility to computing device manufacturers, since it removes the approximately nine to twelve month design cycle for on-board implementations. The present invention also enables the build-to-order, stock-to-order and field repair of any of the systems disclosed, which is a significant advancement for a global economy having needs for just-in-time manufacturing and inventory management.

Those skilled in the art will appreciate that although the present invention has been described in the context of closed platform computing devices such as laptop computers, cellular telephones and PDAs, the present invention may be adapted for use with any device that uses a processor and is not easily changed by a user, such as automotive navigation systems, entertainment systems, all-in-one personal computers, printers and the like. Moreover, although the present invention has been described in the context of standardized, field changeable graphics cards, the present invention may be deployed in other form factors such as credit card polymer substrates with embedded chips, and postage stamp-sized, self-contained devices, among others.

Although the invention has been described above with reference to specific embodiments, persons skilled in the art will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A connector for interfacing a graphics system to a motherboard within a computing device, comprising:
    a plurality of connector pins configured to connect a field-changeable graphics card to the motherboard,
    wherein a first connector pin of the plurality of connector pins is configured to detect the presence of the field-changeable graphics card, and
    wherein upon the first connector pin detecting the presence of the field-changeable graphics card, the remaining connector pins of the plurality of connector pins are configured to route signals from the motherboard to the field-changeable graphics card.

2. The connector of claim 1, wherein the connector is a right-angle edge connector mounted to the motherboard.

3. The connector of claim 1, wherein the connector comprises 230 connector pins.

4. The connector of claim 1, wherein a voltage detected by the first connector pin indicates a mode of the interfaced graphics system.

5. The connector of claim 4, wherein a high voltage detected by the first connector pin indicates that a passive loop-through card is interfaced to the connector.

6. The connector of claim 5, wherein the connector is adapted to cause a low voltage differential signaling (LVDS) signal to be routed from a driver through the loop-through card to an LVDS display panel.

7. The connector of claim 5, wherein the connector is adapted to cause a digital video interface (DVI) signal to be routed from a driver through the loop-through card to a DVI display panel.

8. The connector of claim 7, wherein the loop-through card comprises a transmission minimized differential signaling (TMDS) transmitter for driving TMDS outputs on DVI signals.

9. The connector of claim 4, wherein a low voltage detected by the first connector pin indicates that an active graphics card is interfaced to the connector.

10. The connector of claim 1, wherein the connector is adapted to cause a peripheral component interface (PCI) express signal to be routed from a driver to the active graphics card.

11. The connector of claim 10, wherein the active graphics card is adapted to receive the PCI express signal from the driver in order to generate a plurality of output display signals.

12. The connector of claim 11, wherein the active graphics card is adapted to generate low voltage differential signaling (LVDS), digital video interface (DVI), television (TV) and video graphics array (VGA) signals.

13. The connector of claim 1, wherein the connector is configured to allow a user of a computing device to replace a graphics system post-assembly.

14. The connector of claim 1, wherein the connector is adapted to allow a manufacturer to configure a single motherboard for at least two different graphics modes.

15. The connector of claim 1, wherein the connector is further adapted to maintain a graphics card in a substantially parallel, spaced apart relation relative to the motherboard.

16. The connector of claim 1, wherein the field-changeable graphics card includes circuitry for performing a rendering function for use in the computing device.

17. The connector of claim 16, wherein the field-changeable graphics card includes a graphics processing unit.

18. The connector of claim 16, wherein the field-changeable graphics card further includes an audio chip.

\* \* \* \* \*